United States Patent Office 3,226,296
Patented Dec. 28, 1965

3,226,296
ATTENUATED HOG CHOLERA VIRUS VACCINE AND METHOD OF PRODUCING SAME
William H. Boynton, deceased, late of Berkeley, Calif., by Ethel C. Boynton, widow and executrix, Berkeley, Calif., assignor to Cutter Laboratories, Inc., Berkeley, Calif., a corporation of Delaware
No Drawing. Filed Apr. 5, 1963, Ser. No. 270,986
4 Claims. (Cl. 167—80)

This application is a continuation-in-part of copending application Serial No. 142,731, filed October 3, 1961, now abandoned, which was a continuation of application Serial No. 451,689, filed August 23, 1954, now abandoned, which in turn was a continuation-in-part of application Serial No. 205,424, filed January 10, 1951, now abandoned, which in turn was a continuation-in-part of application Serial No. 686,154, filed July 25, 1946, now abandoned.

The invention covered in this application and in its predecessor applications pertains to a live hog cholera vaccine, to a method of producing such vaccine by the serial passage of the vaccine through an artificial medium in which the virus will propagate and to the use of such vaccine to protect swine against hog cholera.

HOG CHOLERA

Hog cholera is a severe systemic infection produced by hog cholera virus, and is specific for the hog. The virus is considered to be a large protein molecule, and it is generally considered by those skilled in the art that the virus falls far short of being within the range of microscopial visibility, although recently it has been examined by an electron microscope. In the hog, the virus has an incubation period of four to five days, this being followed by pyrexia above 103° F. The symptoms of apathy, loss of appetite, incoordination, and conjunctival discharge all increase until the animal is moribund about the sixth or seventh day and, if not sacrificed, death occurs on the tenth or eleventh day. The mortality resulting from this disease is from 85 percent to 95 percent.

PRIOR ART METHODS OF IMMUNIZATION

The two current procedures, other than the procedure employing a vaccine of this invention, for immunizing hogs against hog cholera are: (a) to inoculate them simultaneously with live hog cholera virus and hog cholera immune serum, and (b) to inoculate them with a killed (non-viable) virus vaccine. The pigs used as a supply of virus for both methods must of necessity be susceptible to hog cholera, and this of course means that slaughter house pigs cannot be used as a source of virus for this purpose. According to an estimate made from figures released by the Bureau of Animal Industry, at least 200,000 pigs were sacrificed in each of the year 1944 and 1945 in the preparation of simultaneous virus and, likewise, at least 500,000 pigs were killed for the production of virus used in hyperimmunizing the serum-producing hogs. In 1948 and 1949, respectively, 147,000 and 188,000 pigs were required for producing virus alone. These pigs cost between $37.00 and $40.00 each and had to be discarded or sold for tankage. These figures are exclusive of the cost of caring for the pigs. The killed virus vaccine does not invoke either a solid immunity or one enduring over a period of years, and the use of a live virulent virus injected simultaneously with antiserum is not a safe procedure. Not only is it difficult to determine the amount of serum needed for optimal neutralization of the virus, but the virulent virus is shed through excreta and discharges, and thus may be spread to susceptible hogs.

MODIFIED OR ATTENUATED VIRUS

A modified or attenuated virus is a live or viable virus which has undergone a weakening of its pathogenic virulence to the extent that, although it may invade a host and multiply, it produces only a subclinical infection wherein the host has the disease without showing all of the typical disease symptoms. It is a well-accepted law of immunology that a subclinical infection can produce firm immunity. Thus, if it were possible to modify or attenuate hog cholera virus so that it would no longer invoke all of the typical syndrome of the disease, such an attenuated virus should nevertheless produce durable immunity in hogs and eliminate the disadvantages attendate to using a killed virus vaccine.

The serial propagation of the virulent hog cholera virus, e.g., in an artificial culture such as herein described, attenuates the virus to the point where it can frequently or always produce a durable immunity without killing the infected animals. However, this degree of attenuation does not occur immediately. Numerous serial propagations are required to produce any measurable attenuation. This fact probably accounts for the failure of Hecke ("Centr. Bakt.," 1, Abt., Orig., 1932, 126, 517) and Tenbroeck ("Cultivation of the Hog Cholera Virus") to discover that the serial passage of the hog cholera virus through an artificial medium could attenuate of the virus. Hecke's only interest was in determining whether he had succeeded in producing an artificial medium in which hog cholera could be made to propagate. To this end, he made one run of 20 serial passages of the virus through his medium, knowing that each serial passage would result in a tremendous dilution of the virus used to inoculate the culture medium in his first test tube. If, therefore, the virus from each successive passage would still kill pigs, this would be conclusive evidence that propagation of the virus was taking place.

Hecke indeed found that the last generation of virus cultivated by him was sufficiently virulent to kill pigs. He therefore correctly concluded that he had succeeded in producing an artificial medium in which hog cholera virus could be made to propagate. Tenbroeck corroborated the work of Hecke.

The Boynton et al. article appearing in Veterinary Medicine, vol. 43, 1948, pages 403–406, carries the work of Hecke and Tenbroeck further. That article sets forth the results of inoculating 18 pigs with virus modified by serially passing live hog cholera virus through an artificial medium for from 73 to 77 times. Table I (page 404) shows that two of these pigs died, that 12 others had abnormally high increases in temperature, and that only 6 of the 18 pigs showed no increase in temperature. In Table II (page 405) the results are given as to what happened to the 16 surviving pigs after they had been challenged with hog cholera virus. Although all 16 pigs survived, the temperature of 13 of them all increased abnormally and only 3 of them showed no rise in temperature. Thus, Boynton et al. proved not only that hog cholera virus could be propagated but showed that partial attenuation of the virus had occurred during the serial propagation. However, it is clear from the results obtained by Boynton et al. after 73–77 propagations that their serially passed virus fell far short of meeting the standards of safety required for a live virus vaccine. Obviously, such a virus could not be and was not considered as useful in a vaccine. As a matter of fact, the Boynton et al. article was not directed to a vaccine but to "Further Studies on Propagation of Hog Cholera Virus in Vitro Including Electron Micrographs."

Although all of the virus utilized in the tests described in the Boynton et al. article was serially passed from 73 to 77 times through an artificial medium and passages up to 89 times were reported, this was insufficient serial passage to produce an attenuated virus useful in a live virus hog cholera vaccine. The serial passage had not been carried out until the virus had become attenuated to the extent that when injected into a susceptible pig it would immunize the test pigs without producing the pathological symptoms of hog cholera. It is in this respect that the serially passed virus reported in the Boynton et al. reference differs from that employed in the vaccine of this invention and the method of making such vaccine. Although Hecke, Tenbroeck and the Boynton et al. each serially passed virulent hog cholera virus through an artificial medium in which the virus would propagate, none of them carried out such serial passages until the virus had fully attenuated so as not to produce pathological symptoms of hog cholera and not one of these references contains any suggestion that this could be done. This, then, is the distinguishing feature between this invention and the closest art, i.e., no one had previously discovered that the hog cholera virus could be so completely attenuated that it would no longer produce some or all of the pathological symptoms of hog cholera when inoculated in pigs. Heretofore, it was believed that such attenuation could never be reached as evidenced by the fact that such full attenuation was not achieved after 77 serial propagations of the virus, which is clear evidence that such attenuation could never be achieved. However, animal tests made against controls in the usual manner have conclusively proved that an attenuated virus produced in accordance with this invention produces solid immunity without ever producing the pathological symptoms of hog cholera in the inoculated pigs.

HOG CHOLERA VIRUS VACCINES

Presently the United States Department of Agriculture recognizes the following three types of Hog Cholera live virus Vaccines:

(a) Hog-Cholera Vaccine, Chemically Modified Virus, Porcine Origin;

(b) Hog-Cholera Vaccine, Chemically Modified Virus, Rabbit Origin, and (c) Hog-Cholera Vaccine, attenuated Live Virus, Tissue Culture Origin (the vaccine of this invention).

(United States Department of Agriculture, Agriculture Research Service, Standard Requirement for Hog-Cholera Vaccine, Modified Live Virus, V–6, of April 5, 1960.)

As indicated by the title of the above publication, it sets forth the standard requirements for such vaccines and incorporates by reference the Department's earlier publication, "Biological Products Memo 55–6, dated September 12, 1955." This latter publication, in turn, sets forth the purity, potency, and safety tests which must be passed by any such vaccine before it can be released for marketing.

Among other conditions the Government requires that the safety and potency tests specified shall be made on each of fourteen healthy susceptible pigs. Four are used as controls and the other ten pigs are injected with the vaccine in question and then subsequently given a challenging dose of virulent live virus.

As to safety, a vaccine will be declared "satisfactory for safety" when at least nine of the ten vaccine-treated pigs remain well throughout the prechallenged period. On the other hand, a vaccine will be declared "unsatisfactory for safety" when two or more of the vaccine-treated pigs become visibly sick subsequent to the third day after vaccination (or on the fourth day, if the third day falls on a Sunday or a holiday) and prior to challenge, but such action will not prevent retest.

As to potency, the Government requires that at least nine of ten vaccine-treated pigs remain well throughout the test period after being challenged by inoculation with virulent hog cholera virus. If two or more of the ten vaccine-treated pigs become visibly sick subsequent to time of challenge, the potency of the vaccine is unsatisfactory.

It is obvious from these standards for safety and potency that a modified or attenuated virus is not useful in a vaccine merely because when injected into a healthy pig it immunizes the pig. The modification or attenuation of the virus must be so complete that when injected into ten healthy pigs not more than one of them becomes ill. The underlying reason for this, of course, is that it is necessary to vaccinate all pigs in a herd, healthy or otherwise. Thus, an unhealthy pig might not survive an injection of a partially attenuated live virus which gives rise to no symptoms of the disease when injected into a healthy pig. Furthermore, as both virulent and attenuated virus are shed from vaccinated pigs by way of excreta, if the virus is insufficiently attenuated the inoculation would serve to spread rather than control the disease.

Another reason why all attenuated virus are not necessarily vaccines in the pharmaceutical sense, merely because when injected into a healthy pig they may immunize the pig, is that a hog cholera virus which has been attenuated by serial propagation an insufficient number of times, when transmitted through the excreta of the inoculated pig to a suspectible pig can revert to a virulent form of the virus. This, obviously, would serve to sperad the disease. Therefore, for an attenuated virus to be acceptable for use in a vaccine, it must be permanently as well as fully attenuated. That a fully attenuated virus is permanently fully attenuated can be determined by subjecting a fully attenuated generation of the virus to further serial propagation to verify that subsequent serially propagated generations of the fully attenuated virus also do not produce pathological symptoms when injected in healthy test pigs while imparting immunity to the pigs. This "buffer" propogation i.e. serial propagations subsequent to the propagation of a generation which produces a complete loss of pathological activity in the virus, is vital to the production of an acceptable live attenuated hog cholera vaccine formed from live attenuated hog cholera virus because reversion to virulent form is possible if serial propagation is conducted on an insufficient number of generations, as will be apparent from the results shown in the examples below.

OBJECTS OF INVENTION

One of the objects of this invention is the provision of a method for producing hog cholera vaccine from live hog cholera virus which includes serially passing hog cholera virus through an artificial culture medium in which the virus will propagate until a fully and permanently attenuated virus is obtained which is capable of immunizing pigs without giving rise to the pathological symptoms of hog cholera, i.e., high temperatures other than mildly elevated, sickness or death.

Another object of this invention is the provision of a method of immunizing pigs against hog cholera wherein the pigs are injected with a vaccine of the character above described.

A further object of this invention is the provision of a vaccine having as its immunizing ingredient a fully and permanent attenuated live hog cholera virus.

Other objects will be obvious to those skilled in the art to which this invention pertains.

According to this invention, virulent hog cholera virus is serially propagated in a culture medium in which the virus will propagate until the virus has become fully and permanently attenuated. The virus is then propagated as a source for vaccine.

Once a fully and permanently attenuated virus generation is obtained, serial propagation is unnecessary and the virus can be propagated in any syntheic medium in which it will grow, i.e., in one large batch.

To determine that an attenuated hog cholera virus has become fully attenuated, one need only periodically test cultures of serially propagated virus for safety as well as potency using the standards for safety set forth by the United States Government. When a generation is obtained which produces no pathological symptoms of hog cholera, i.e., excessively high temperature, sickness or death in the test pigs, then full attenuation has been achieved.

To detremine that a fully attenuated virus has become permanently fully attenuated, i.e., lost its latent or reversionary virulence, it is necessary to test the virus infectivity of each successive culture or generation of the serially propagated virus. When a number of successive generations are obtained all of which show a lack of pathological virulence in healthy test pigs, i.e. produce no more than a slight fever for 1–3 days, so as to be persuasive to a virologist that latent or reversionary virulence has been permanently lost, the thus-produced attenuated virus can be used directly as a vaccine or used as a culture to produce larger amounts of such vaccine. The exact number of successive non-virulent serially propagated generations which must be produced to be persuasive to a virologist that permanent loss of virulence has been achieved will, of course, depend upon the judgment of the individual virologist. At first, at least about 50 such successive non-virulent generations were felt necessary to be persuasive that permanent full attenuation of the virus had been achieved. However, experience has shown that only about 20 such successive non-virulent generations are necessary to establish the permanence of the full attenuation.

If the virus has become fully and permanently attenuated, then that generation or any subsequent serially propagated generation can be used as a source of live virus culture to propagate in amounts suitable for commercial vaccine production. However, generally at least the 20th and preferably at least the 50th serially propagated generation subsequent to the fully and permanently attenuated virus generation is used.

EXAMPLE 1

The initial step in producing an attenuated live virus involves the preparation of a suitable culture medium in which virulent hog cholera virus can be propagated. Three examples of such media will be described herein, but no invention in such media per se is here claimed.

Preparation of media

In the first example of such a culture medium, a serum free from all hog cholera-immune fractions is resorted to. Since these fractions, if any, are always associated with the protein content of the serum, they can be eliminated by removing such protein content. This can be done conveniently by ultra-filtering the serum through collodion membrane in the form of a sac preparation in accordance with the method used by Greenberg and Gunther, as described in detail in the Journal of Biological Chemistry, 1930, volume 85, pages 491–508. It is therefore immaterial whether a cholera-immune or nonimmune pig is used as a source of the serum.

Fifteen to twenty-five cubic centimeters of this immunebody free serum is diluted with 80 cc. of a physiologic solution such as employed by Simms and Sanders and described in Arch. Path. 1942, volume 33, pages 619–635. Briefly, this solution consists of a mixture of two solutions which conveniently can be referred to respectively as Solutions Numbers I and II.

Solution No. I consists of 160 grams NaCl, 4 grams KCl, 2.94 grams $CaCl_2 \cdot H_2O$, and 4.06 grams $$MgCl_2 \cdot 6H_2O$$

all dissolved in 1 liter of distilled water.

Solution No. II consists of 20.2 grams $NaHCO_3$, 4.26 grams $Na_2HPO_4$, and 20.00 grams dextrose; all dissolved in 1 liter of distilled water containing phenol-red as an indicator. Solution No. II is sterilized by ultraviolet irradiation or by filtration through fritted glass.

To prepare the physiologic solution used in the culture medium, 50 cc. of Solution No. I are diluted with 900 cc. of freshly redistilled water and autoclaved. Upon cooling, 50 cc. of Solution No. II are added aseptically and the resultant physiologic solution is kept in sterile stoppered containers at a pH of about 7.4.

After the 15 to 25 cc. of ultrafiltrate have been diluted with the 80 cc. of physiologic solution, the resulting serum ultrafiltrate medium is sterilized by irradiation or by filtration, preferably through a Corning glass filter provided with fritted disc.

The sterile serum ultrafiltrate medium is then distributed in 15 cc. amounts into relatively large test tubes in the order of 200 mm. x 25 mm. and the pH of each adjusted to from 7.4–7.5 by the addition of carbon dioxide or by the temporary removal of the tube stoppers and by replacement with sterile cotton plugs.

To foster the multiplication of virus in the ultrafiltrate medium, about six (6) drops of living pig tissue suspension are added to the contents of each test tube. A suitable contamination-free suspension for this purpose can be prepared as follows:

A small quantity (in the order of ½ to 2 grams) of reticulo-endothelial tissue from a noncholera-immune pig is placed in a Petri dish. Red bone marrow is preferably used as being less likely to be contaminated, although spleen, lymph and other tissues are also satisfactory. About 8 cc. of the ultrafiltrate medium is then added to the tissue and the tissue finely minced therein by any suitable means, such as curved scissors.

After all calcareous tissue, when red bone marrow is used, has been removed from the resulting tissue suspension, about six (6) drops of it are added to the contents of each test tube. Each test tube is then incubated for about eighteen (18) hours to insure sterility. Following this, the pH of each tube should be checked and if necessary readjusted to 7.4–7.5 by the addition of carbon dioxide or temporarily replacing their rubber stoppers with sterile cotton plugs.

Virus culture

Finally, the tissue culture medium of each test tube is inoculated with from one (1) to 0.5 cc. of a suspension of bone marrow or other reticulo-endothelial tissue or blood from a cholera-infected pig and incubated at 37° C. for three (3) days and then held at room temperature for one (1) more day. The resulting test tube batches of hog cholera virus culture supernatant fluids can then be pooled and held under refrigeration for viability tests and for inoculation of succeeding artificial culture media.

Serial propagation of the virus

Inoculate 15 cc. of the above-described medium with about 0.5 cc. of the original culture, incubate for 72 hours at 37° C. and then for an additional 24 hours at room temperature to produce culture or generative number 2. A second 15 cc. portion of medium is then inoculated with 0.5 cc. of culture number 2 and incubated as above indicated to produce culture or generative number 3. A third 15 cc. portion of medium is then inoculated with 0.5 cc. of culture number 3 and incubated to produce culture number 4.

This procedure has been duplicated for over 220 passages, a test of virus infectivity having been made for each successive culture. The titer obtained in the early passages, e.g., the fifteenth passage, was $10^{-10}$ power or higher.

As indicated above, it was found that attenuation of the virus occurred after many passages through the above medium, a point ultimately being reached where the culture or the supernatant portion was so free of virulence that the virus could be used as a vaccine for producing durable immunity. The degree of modification or attenuation depends upon the number of transfers to which the virus has been subjected. Therefore, the number of transfers which must be made to modify the culture to the desired extent is arrived at by periodic testing of cultures for virulence and immunizing power. It was found that initial, incomplete attenuation occurs anywhere from the 15th to the 33rd passage.

For example, in one serial passage run, evidence of partial attenuation occurred at the 15th passage, whereas in other runs partial attenuation occurred respectively anywhere from the 15th passage to the 33rd passage. Since no precise prediction can be made with respect to any particular run as to how many serial passages must be made before complete attenuation occurs, the desired end point can be determined only as a result of routine tests for safety and potency. More specifically, the tests to be here applied are precisely those required by the Government to determine satisfactory safety and potency.

Animal tests made against controls in the usual manner have proved that an attenuated live virus serially passed through an artificial medium of the type described above can produce solid immunity in the test animals after from 49 to 157 passages, depending upon the run. Full attenuation occurs subsequent to this partial attenuation.

Generally speaking, at least 90 or more serial passages of the virus is ordinarily required to achieve permanent full attenuation, but such permanent full attenuation, using the identical starting virulent virus culture, can require as few as 80 or less or 100 or more serial propagations in different runs. The reason for this is now clear in view of subsequently discovered evidence concerning the protein structure of virus. Virulence apparently is lost as a result of a permanent alteration of this protein structure, caused by the repeated propagation of the virus in an artificial environment. The precise generation of serially propagated virus when this occurs varies from run to run, but it inevitably occurs.

The following table presents data on the effect of the serial passage of virulent hog cholera virus in the medium of Example 1 in accord with the invention:

Two pigs were inoculated with 1.0 milliliter of undiluted virus, unless otherwise indicated, and the degree of reaction following inoculation is shown on either side of the diagonal mark under "Comment," an "0" indicating no temperature rise, a "+" indicating a slight fever for one to three days, "++" indicating high temperatures for two to five days, "+++" indicating severe reaction with high temepratures for longer than five days and/or death of the test pig. ++ and +++ responses are so severe as to be pathological symptoms of hog cholera.

| Passage and number: | Comment |
|---|---|
| 1 | Virulent virus |
| 2–8 | +++ (virus titer <$10^3$ LD/50 ml., six pigs inoculated) |
| 9 | +++ (virus titer >$10^3$, <$10^5$ LD/50 ml., six pigs inoculated) |
| 10–64 | ++ to +++ |
| 65 | 0/+++ |
| 66 | ++/0 |
| 67 | 0/0 |
| 68 | +/+ |
| 70–83 | 0 to +++ |
| 84–88 | 0 to + |
| 89 | +/++ |
| 90–102 | 0 to + |
| 103 | +++/+++ |
| 104–107 | 0 to + |
| 108 | +++/+++ |
| 109–227 | 0 to + |

Note that the generations up to about 65 retained virulence sufficient to produce ++ and +++ pathological responses, a result consistent with the observations of Boynton et al. cited above. After about the 66th generation, temporary loss of pathological virulence occurred but the virulence again manifested itself in subsequent generations. This re-manifestation of virulence also occurred at the 89th, 103rd and 108th generations. Here, then is ample proof of the unobviousness of this invention. By all reasonable standards, one would predict that if permanent loss of pathological virulence had not occurred by the 108th generation, such virulence would never be permanently lost, thus eliminating serial propagation as a means for converting hog cholera virus into a form suitable for use as a live virus vaccine.

However, after the 108th generation there was no further reappearance of pathological virulence and a permanently fully attenuated hog cholera virus suitable for use as a live virus vaccine had been produced. There remained only to continue serial propagation for a sufficient number of addition generations to confirm this fact.

Animal tests also show that the blood and spleen tissue of hogs previously inoculated with the above-described permanently fully attenuated virus culture also effectively serves to immunize hogs. This conclusively proves that:

(1) The attenuated virus does not regain its pathological virulence after consecutive passage through two susceptible pigs, i.e., by passage through the natural host animal; and (2) The blood and spleen tissues collected from pigs inoculated with the modified virus contain the fully attenuated virus, and therefore can also be used as a vaccine in proper pharmaceutical form.

1st ALTERNATIVE MEDIA

EXAMPLE No. 2

*Synthetic tissue culture media*

As an alternative to the media above described, a medium prepared in accordance with the following procedure can be used:

A ten-fold concentrate of the bulk of certain stable ingredients of the medium is first prepared from certain mixtures and solutions. This concentrate is then diluted to normal concentration, at which time certain required labile ingredients and antibiotics are added.

I. *Preparation of stock mixture and stock solutions*

The following ingredients (Mixture A) are added in the solid form to the ten-fold concentrate as an 18 liter batch thereof is prepared:

MIXTURE A

| Ingredients: | Required grams for 180 liters or 18 liters of 10-fold concentrations |
|---|---|
| L-arginine, mono HCl | 12.6 |
| L-histidine, HCl | 3.6 |
| L-lysine, HCl | 12.6 |
| DL-tryptophane | 3.6 |
| DL-phenylalanine | 9.0 |
| DL-methionine | 5.4 |
| DL-serine | 9.0 |
| DL-theronine | 10.8 |
| DL-leucine | 21.6 |
| DL-isoleucine | 7.2 |
| DL-valine | 9.0 |
| DL-glutamic acid, monohydrate | 27.0 |
| DL-aspartic acid | 10.8 |
| DL-alpha-alanine | 9.0 |
| L-proline | 7.2 |
| L-hydroxyproline | 1.8 |
| Glycine | 9.0 |
| L-glutamine | 18.0 |
| Sodium acetate | 9.0 |

SOLUTION B.—METHOD OF PREPARATION (1) Dissolve 7.2 grams of tyrosine and 3.6 grams of cystine in 3600 cc. of 0.075 N HCl with *gentle* heating and vigorous shaking.

(2) Place solution in a 37° C. water bath and shake at intervals; finally, incubate overnight in the water bath. Tyrosine and cystine are the least soluble of the amino acids.

SOLUTION C.—METHOD OF PREPARATION (1) Dissolve the following dry ingredients in approximately 175 cc. of demineralized water (less than 0.3 p.p.m. chloride):

|  | Grams |
|---|---|
| Niacin | 0.025 |
| Niacin amide | 0.025 |
| Pyridoxine | 0.025 |
| Pyridoxal | 0.025 |
| Thiamin | 0.010 |
| Riboflavin | 0.010 |
| Ca pantothenate | 0.010 |
| i-Inositol | 0.050 |
| P-Amino benzoic acid | 0.050 |
| Choline | 0.500 |

(2) Bring the volume to 200 cc. with demineralized water. (Some ingredients are not readily soluble but will eventually go into solution with vigorous shaking and use of a stirring rod.)

(3) Seitz filter and dispense in sterile serum vials (36 cc./vial) (S–1 EK Seitz under positive pressure).

(4) Store Solution C in the cold room and in the *dark*.

SOLUTION E.—METHOD OF PREPARATION (1) Dissolve 0.010 gram of biotin in approximately 75 cc. of demineralized water.

(2) Add 1.0 cc. of 1.0 N HCl to increase the stability in storage.

(3) Bring to a volume of exactly 100 cc. with demineralized water.

(4) Seitz filter and dispense in sterile serum vials (18 cc./vial).

(5) Store Solution E in the cold room.

SOLUTION F.—METHOD OF PREPARATION (1) Dissolve 0.010 gram of crystalline folic acid in 100 cc. a single strength Hanks basic salt solution (B.S.S., Merck).

(2) Seitz filter and dispense in sterile serum vials (18 cc./vial).

(3) Store Solution F in the cold room.

SOLUTION H–K.—METHOD OF PREPARATION (1) Dissolve 0.020 gram of crystalline vitamin $D_2$ (calciferol) in 40 cc. of EtOH (95%).

(2) Add 0.040 gram of cholesterol to the above. (Stirring rod and vigorous shaking required to dissolve cholesterol.)

(3) Add 60 cc. of 5% Polysorbate 80 (U.S.P. XIV).

(4) Seitz filter and dispense in sterile bottle (90 cc./bottle).

(5) Store Solution H–K at room temperature.

SOLUTION I.—METHOD OF PREPARATION (1) Dissolve 0.010 gram of vitamin E (disodium alpha tocopherol) in 100 cc. of demineralized water. (Forms a soapy solution.)

(2) Seitz filter and dispense in sterile serum vials (18 cc./vial).

(3) Store Solution I in the cold room.

SOLUTION J.—METHOD OF PREPARATION (1) Dissolve 0.010 gram vitamin K (menadione) in 100 cc. of demineralized water.

(2) Vigorous shaking and/or overnight incubation at 37° C. to dissolve vitamin K.

(3) Seitz filter and dispense a sterile serum vials (18 cc./vial).

(4) Store Solution J in the cold room.

SOLUTION L.—METHOD OF PREPARATION (1) Dissolve 1.8 grams of adenine sulphate in 200 cc. of demineralized water.

(2) Gentle heating and the addition of 0.25 cc. of concentrated $NH_4OH$ will hasten the dissolving of this compound.

(3) This solution is made fresh for each batch of tenfold concentrate.

SOLUTION M.—METHOD OF PREPARATION (1) Dissolve xanthine, hypoxanthine, thymine, and uracil in weighted amounts of 0.100 gram each in 1000 cc. of demineralized water. (3.5 cc. of concentrated $NH_4OH$ previously added to the volumetric flask.)

(2) Constant vigorous shaking and a *small* amount of heat will aid in dissolving the compounds.

(3) Seitz filter and store in sterile bottle (540 cc./bottle).

(4) Store Solution M in the cold room.

SOLUTION $M_1$.—METHOD OF PREPARATION (1) Dissolve 0.054 gram of guanine·HCl in 500 cc. of demineralized water, add 1.5 cc. of concentrated $NH_4OH$ and bring to a volume of 540 cc. with demineralized water.

(2) Bring solution to a boil and after cooling bring back to volume of 540 cc. with demineralized water.

(3) Solution $M_1$ is prepared fresh for each batch of ten-fold concentrate.

SOLUTION N.—METHOD OF PREPARATION (1) Dissolve 0.100 gram of d-ribose and 0.100 gram of d-α-desoxyribose in 100 cc. of demineralized water.

(2) Seitz filter and dispense in sterile bottle (90 cc./bottle).

(3) Store Solution N in the cold room.

SOLUTION O.—METHOD OF PREPARATION (1) Dissolve 0.04 gram of adenylic acid in 100 cc. of demineralized water.

(2) Seitz filter and dispense in sterile bottles (90 cc./bottle).

(3) Store Solution O in the cold room.

SOLUTION Q.—METHOD OF PREPARATION (1) Dissolve 0.100 gram of $Fe(NO_3)_3 \cdot 9H_2O$ (Eimer and Amend Co.) in 100 cc. of demineralized water. (Add one drop of concentrated $HNO_3$.)

(2) Seitz filter and dispense in sterile serium vials (18 cc./vial).

(3) Store Solution Q in the cold room.

II. *Prepare ten-fold concentrate*

[Caution]

A. All beakers and flasks containing the dry salts or solutions of salts should be washed with demineralized water and these washings added to the carboy.

B. The adding volume due to washings should be taken into account in maintaining the approximate volumes in the carboy at the various steps.

C. Between each addition of a subsequent salt or solution, the carboy should contain no undissolved salts added prior to that particular step. (All salts should be dissolved or added solutions well mixed before proceeding to the next step.)

D. It is best to dissolve the various ingredients in the order given to prevent possible complications or formation of insoluble precipitates.

STEPWISE PROCEDURE (1) Dissolve 1440 grams NaCl in 3600 cc. Solution B (prepared in advance) in a five-gallon carboy.

(2) Add Solutions M and $M_1$ to the carboy (540 cc. of each).

(3) Add 72 grams KCl to the carboy and dissolve.

(4) Dissolve 36 grams $MgSO_4 \cdot 7H_2O$ in the carboy. The volume at this point with the washings from the beakers containing the various salts should be approximately 6 liters.

(5a) Dissolve 10.8 grams $KH_2PO_4$ in approximately 1 liter of demineralized water in a 2-liter flask.

(5b) Dissolve 10.8 grams Na₂HPO₄ in the flask of (5a) and bring the volume to approximately 2 liters with demineralized water.

(6) Add the solution prepared in (5a) and (5b) to the carboy. The volume at this point should be approximately 8 liters.

(7a) Dissolve 180 grams glucose in approximately 1 liter of demineralized water in a 2-liter flask.

(7b) Add 3.16 grams phenol red dye to the flask, dissolve and bring the volume to approximately 2 liters with demineralized water.

(8) Add the solution prepared in (7a) and (7b) to the carboy. The volume at this point should be approximately 10 liters.

(9) Dissolve 25.2 grams anhydrous (12 mesh) CaCl₂ in approximately 3 liters of demineralized water in a 4-liter flask.

(10) Add CaCl₂ solution to the carboy *slowly* and with vigorous shaking and stirring of the solution in the carboy. (This will prevent the localized precipitate of insoluble Ca₃(PO₄)₂.)

(11) Add indicated quantities of stock Solutions C, E, F, H–K, I, J, N, O, and Q to the carboy (total volume of 396 cc.).

| Solution | Volume (cc.) | Solution | Volume (cc.) |
|---|---|---|---|
| C | 36 | J | 18 |
| E | 18 | N | 90 |
| F | 18 | O | 90 |
| H–K | 90 | Q | 18 |
| I | 18 | | |

The volume at this point with the washings should be approximately 14 liters.

(12) Prepare Solution L as above indicated and add it to the carboy.

(13) Dissolve penicillin and streptomycin in demineralized water (total, 1,800,000 units of each), and add to carboy. The volume at this point should be approximately 15 liters.

(14) Bring volume of solution in the carboy to approximately 17 liters with demineralized water.

(15) Add, in sold form, the amino acids and sodium acetate of Mixture A to the carboy. Shake and stir solution vigorously until all but a few crystals are dissolved.

(16) Place in the cold room overnight. During this period the undissolved particles (leucine and iso-leucine) will usually go into solution.

(17) Bring to exactly 18 liters with demineralized water and stir well.

(18) Filter through a 2-liter Seitz filter using positive pressure. Pad used is a S–1 sterilizing Seitz asbestos pad, size 14.

(19) Collect the filtrate in a sterile 5-gallon carboy and dispense into sterile 16-ounce prescription bottles (350 cc. of the ten-fold mixture being placed in each bottle). Store the bottles of ten-fold concentrate in the cold room until ready for use.

III. *Prepare normal dilution from ten-fold concentrate* (*Stepwise procedure*)

(I) 350 cc. of the ten-fold concentrate is added to 3 liters of sterile, demineralized water in a graduated 4-liter Pyrex bottle.

PREPARATION OF SOLUTION D–G–P (1) Solution D–G:

(a) *Solution D.*—Dissolve L-cysteine·HCl, 10 mg., glutathione, 5 mg., and ascorbic acid, 5 mg., in 50 cc. of demineralized water.

(b) *Solution G.*—Dissolve 10 mg. crystallized vitamin A, alcoholic, in 1 cc. EtOH and then added 10 cc. Tween 80. Add the mixture to 50 cc. of Solution D.

Bring volume to 100 cc. with demineralized water. Seitz filter and store in the cold room.

II. Solution D–G–P:

(a) *Solution P.*—Dissolve 10 mg. adenosine triphosphate (disodium salt) in each cc. of Solution D–G and filter the resulting solution through a Seitz filter.

(2) 3.5 cc. of Solution D–G–P; (prepared fresh) are added to said 4-liter Pyrex bottle.

(3) The bottle is brought to a volume of 3.5 liters with sterile, demineralized water.

(4) The bottle of normal dilution is stored in the cold room until used.

(5) Before usage, the pH of the medium is adjusted to pH 7.4–7.6 by the addition of varying amounts of 2.8% NaHCO₃. The carbonate solution (to which 0.002% phenol red dye in soluble form has been added) is dissolved in demineralized water and sterilized by Seitz filtration.

(6) Addition of antibiotics:

(a) 600,000 units of penicillin G (sodium salt) are dissolved in approximately 30 cc. of Hank's basic salt solution (B.S.S., Merck).

(b) 1,000,000 units of streptomycin sulfate (Pfizer) are added to 5 cc. of B.S.S.

(c) 1.5 cc. of the B.S.S. streptomycin solution is added to the 30 cc. B.S.S. penicillin solution and the volume made up to 60 cc. with B.S.S.

(d) 20 cc. of this stock solution of antibiotics are added to each liter of pH adjusted normal dilution (200,000 units penicillin and 100,000 units of streptomycin).

(7) 15 cc. of volumes of the solution resulting from the above procedure are then poured into a number of test tubes for the serial passage therein of the hog cholera virus.

(8) Prior to the serial passage of hog cholera virus within the above mentioned test tubes, there is added to the solution in each test tube ½ cc. of living pig tissue suspension.

SECOND ALTERNATIVE MEDIA

EXAMPLE No. 3

COMMERCIAL SYNTHETIC MEDIA

As an alternative to the two media above described, it is possible to use a synthetic medium solution prepared by Difco Laboratories, Inc., 920 Henry Street, Detroit 1, Michigan, commercially available as Difco TC–199. Just before using this medium, ½ cc. of living pig tissue suspension prepared as above described, is added to each 15 cc. of media.

The attenuation of hog cholera virus by the serial passage thereof in either of these two alternative media (Examples 2 and 3) is carried on in the same manner as described with respect to the pig serum media (Example 1) and with substantially the same results.

ALTERNATIVE VIRUS CULTURE

An alternative and novel procedure was also employed for preparing the artificial medium and for culturing the virus in the artificial medium. This novel method does away with the need of obtaining sterile pig tissue except for the first propagation when an initial culture of pig tissue is made. A sterile sample of bone marrow tissue is taken and added to an artificial liquid culture medium consisting of the above-described synthetic tissue culture medium to which has been added approximately 40–60 percent of pig serum. This mixture is incubated for approximately one week, or until the growth of an embryonic type of call known as fibroblasts is evident by microscopic examination. A sample of the fibroblasts is then carefully removed under sterile conditions and is transplanted to a second portion of the same mixture of the synthetic tissue culture medium and pig serum. This mixture is again incubated for approximately one week, at which time the fibroblasts are again transplanted to the third portion of similar medium. After about five transplants according to this procedure a pure culture of pig fibroblasts is obtained which can be kept growing indefinitely by consecutive transplanting according to the procedure just described.

This culture of fibroblasts served as a substitute for the reticulo-endothelial tissue of the above examples.

In the process of serially subculturing the virulent virus to obtain attenuated virus, a sample of a culture of fibroblasts is added to either of the synthetic culture media described above contained in a glass vessel and the mixture is incubated as usual. When the cells begin to propagate, a sample of the virus is added and at the end of the incubation period the greatly multiplied fibroblasts are found adhering to the surface of the glass container. The liquid portion of the medium is removed and a new portion of synthetic medium is added to the same glass container. It is not necessary to transplant the virus because the culture inoculates itself by virtue of residual virus in or on the fibroblasts adherent to the surface of the glass. This procedure is repeated serially and serves exactly the same purpose as serially subculturing by the procedures previously described, but is much more convenient in that the virus does not have to be transferred each time and in that no further recourse need be had to a susceptible pig. This alternative method of serial tissue culture had been found to attenuated the virulent virus and has been found to propagate apparently indefinitely the attenuated virus.

Here it should be noted that the use of living pig cells as herein contemplated is the full equivalent of use of living reticulo-endothelial tissue, for the latter includes the former.

On the 26th day of November, 1952, Cutter Laboratories, of Berkeley, California, was issued a license by the Department of Agriculture to produce and sell a live virus hog cholera vaccine as herein described, a copy of said license as issued by the Department of Agriculture being of record in the application of William H. Boynton, Serial No. 205,424, as Exhibit No. 3, attached to the amendment filed on the 11th day of February 1953 (Paper No. 5). Since that time Cutter Laboratories has sold over 16,000,000 doses of vaccine made under said license. No reported case of a pathological reaction to the vaccine or as a result of inoculation with such vaccine has been reported.

The pharmaceutically acceptable forms of hog cholera vaccines employing a permanently fully attenuated live hog cholera virus of this invention will be apparent to those skilled in the art and can take the forms conventionally employed for virus vaccines.

Because the hog cholera virus of the vaccine of this invention is fully and permanently attenauted, inoculations can be made in the presence or absence of simultaneous serum. As with other living virus vaccines, dosage is not critical. The conventional dose for hog cholera virus vaccines, i.e., 1 cc. for pigs weighing 45 lbs. or less and 2 cc. for pigs weighing more than 45 lbs., can be used. See 9 CFR 154–188 (1949) and 15 CFR 3721 (1950), especially Parts 118.25, 118.30, 118.44 and 119.52 of Title 9.

It will also be apparent to those skilled in the art that the gist of this invention resides in the discovery that hog cholera virus can be fully and permanently attenuated so as to permit its use in a hog cholera vaccine and that modifications and variations of the method of producing and using such attenuated virus as a vaccine disclosed herein will be obvious to those skilled in the art, once informed of this discovery.

What is claimed is:

1. An attenuated hog cholera vaccine containing an attenuated hog cholera virus capable, by growth, of invoking the production of antibodies and the development of a specific resistance to and a durable immunity against hog cholera without the appearance of the usual symptoms of the disease and which eliminates the disadvantages attendant to using either inactivated virus vaccines or virulent virus in combination with an anti-serum, produced by a method wherein the desired attenuation is effected by serial passage propagation of virulent hog cholera virus through a number of succeeding passages in succeeding portions of an artificial culture media containing living hog tissue, free from hog cholera immune fractions, thereby attenuating the virus culture beyond the measurable degree of attenuation which occurs anywhere from the 15th to the 33rd passage to the point where animal tests, made against controls in the usual manner, prove that portions thereof can serve as vaccines for producing a durable immunity, said point, which is usually found in passages 49 to 157, being characteristically found by animal tests which show the blood and spleen tissues of hogs previously inoculated with such a modified virus culture effectively serve to immunize hogs, conclusively proving that (1) the virus did not increase in virulence due to the consecutive passage through two pigs; and that (2) the blood and spleen tissues collected from pigs inoculated with the modified virus contain the modified virus.

2. A vaccine containing live attenuated virus obtained from at least one of the blood and spleen tissues collected from a pig inoculated with a vaccine according to claim 1.

3. A method for producing an attenuated hog cholera vaccine containing an attenuated hog cholera virus capable, by growth, of invoking the production of antibodies and the development of a specific resistance to and a durable immunity against hog cholera without the appearance of the usual symptoms of the disease and which eliminates the disadvantages attendant to using either inactivated virus vaccines or virulent virus in combination with an anti-serum, wherein the desired attenuation is effected by serial passage propagation of virulent hog cholera virus through a number of succeeding passages in succeeding portions of an artificial culture media containing living hog tissue, free from hog cholera immune fractions, thereby attenuating the virus culture beyond the measurable degree of attenuation which occurs anywhere from the 15th to the 33rd passage to the point where animal tests, made against controls in the usual manner, prove that portions thereof can serve as vaccines for producing a durable immunity, said point, which is usually found in passages 49 to 157, being characteristically found by animal tests which show the blood and spleen tissues of hogs previously inoculated with such a modified virus culture effectively serve to immunize hogs, conclusively proving that (1) the virus did not increase in virulence due to the consecutive passage through two pigs; and that (2) the blood and spleen tissues collected from pigs inoculated with the modified virus contain the modified virus.

4. A method according to claim 3 in which said serial propagation is continued until multiple successive passages each produce an attenuated virus which imparts durable immunity without the usual symptoms of the disease, and tissue culture propagating a generation of said virus which has been propagated serially beyond the generation which produces a pathological response in said healthy, normal pigs as a source of attenuated hog cholera virus suitable for use in a live virus vaccine.

References Cited by the Examiner

Boynton: "Preliminary Report on the Propagation of Hog Cholera Virus in Vitro," Vet. Med. 41: 346–347, (1946); abstracted in Biological Abstracts 21: 3794 (1947).

Boynton, W. H., et al.: Further Studies on Propagation of Hog Cholera Virus in Vitro Including Electron Micrographs," Vet. Med. 43: 403–406, October 1948; abstracted in Biological abstracts 23: 4542 (1949).

(Other references on following page)

References Cited by the Examiner

Boynton: Great Britain, 627,584, published Aug. 11, 1949 (2 pp. spec.), amended May 2, 1950 (3 pp. spec.).

Boynton: Great Britain, 739,728, published Nov. 2, 1955 (4 pp. spec.).

Casselberry, N. N., et al. (pp. 230–233); Harvey et al. (pp. 224–229); Killinger et al. (pp. 234–237); Koprowski et al. (pp. 214–223); Report of 55th Annual Meeting of United States Livestock Sanitary Association, pp. 214–237, November 1951 (U.S.D.A. Library #49.9 Un 3R).

Casselberry, N. H. et al.: "Hog Cholera Immunization With a New Vaccine, Propagated in Vitro, and Hog Cholera Antiserum," Vet. Med. 48 (I): 24–27, 1953; abstracted in Biological Abstracts 27, 20149 (1953).

Casselberry, N.H. et al.: "Controlled Experiment to Test Duration of Immunity Against Hog Cholera Induced in Pigs Vaccinated With Sterile Tissue Cultured Vaccine and Serum," Vet. Med. 48 (2): 48–50, 60 (1953), abstracted in Biological Abstracts 27: 25587 (1953).

Code of Federal Regulations, Title 9, Parts 101 to 122; issued under authority of the Virus-Serum-Toxin Act of March 4, 1913, 37 Stat. 832–833, 21 U.S.C. 151–158, by Animal Inspection and Quarantine Division, ARS USDA.

Hejl, J. M.: "Controls for Production of Hog Cholera Immunization Agents," pp. 169–178; Dunne, H. W.: Serum Block in the Vaccination for Hog Cholera," pp. 161–166; Mott, L.O.: "Hog Cholera-Virulent Virus and Killed Virus Vaccines," pp. 135–148; York, C. J.: "Modified Hog Cholera Viruses," pp. 149–152; all pages cited in Proceedings Oct. 29–30, 1961, Symposium on Hog Cholera, U. Minn.; ed. by G. T. Mainwaring et al.

Sanders, E. F., et al.: "Current Status of Hog Cholera Vaccines," U.S. Livestock Sanit. Assoc. Proc. (1949); 156–162 (1950), (U.S.D.A. Library #49.9 Un. 3R).

Tenbroeck, C.: "Cultivation of the Hog Cholera Virus," J. Exp. Med. 74: 427–432, Nov. 1, 1941.

U.S.D.A., Agricultural Research Service, Animal Inspection and Quarantine Branch, Biological Products Memo V–6: "Standard Requirement for Hog-Cholera Vaccine, Modified Live Virus: (a) Porcine Origin, (b) Rabbit Origin, (c) Tissue Culture Origin," 3 pp., dated April 7, 1960, December 19, 1961, and July 2, 1962.

LEWIS GOTTS, *Primary Examiner.*

SHEP K. ROSE, *Assistant Examiner.*